United States Patent [19]

Monson et al.

[11] Patent Number: 5,220,876
[45] Date of Patent: Jun. 22, 1993

[54] VARIABLE RATE APPLICATION SYSTEM

[75] Inventors: Robert J. Monson, St. Paul; Norman A. Bauer, Watertown, both of Minn.

[73] Assignee: Ag-Chem Equipment Co., Inc., Minnetonka, Minn.

[21] Appl. No.: 902,174

[22] Filed: Jun. 22, 1992

[51] Int. Cl.⁵ .................. A01C 15/00; A01C 21/00; A01C 23/00

[52] U.S. Cl. ................................ 111/130; 111/903; 111/200; 239/1; 239/61; 239/63

[58] Field of Search ............... 172/1, 2; 111/118, 119, 111/130, 903, 904, 200; 239/1, 61-65

[56] References Cited

U.S. PATENT DOCUMENTS

| | | |
|---|---|---|
| 3,143,295 | 8/1964 | Booker . |
| 3,330,070 | 7/1967 | Ferm et al. . |
| 3,511,411 | 5/1970 | Weiss . |
| 3,770,198 | 11/1973 | Mihara . |
| 3,855,953 | 12/1974 | Fathauer et al. . |
| 3,945,332 | 3/1976 | Wirsbinski . |
| 4,014,271 | 3/1977 | Rohlf et al. . |
| 4,015,366 | 4/1977 | Hall, III ........................... 239/69 X |
| 4,116,138 | 9/1978 | McFarland et al. . |
| 4,277,022 | 7/1981 | Holdsworth . |
| 4,350,293 | 9/1982 | Lestradet . |
| 4,358,054 | 11/1982 | Ehrat ................................ 239/61 X |
| 4,588,127 | 5/1986 | Ehrat . |
| 4,630,773 | 12/1986 | Ortlip . |
| 4,714,196 | 12/1987 | McEachern et al. ................ 239/62 |
| 4,723,710 | 2/1988 | Lucore . |
| 4,798,325 | 1/1989 | Block . |
| 4,878,614 | 11/1989 | Hach et al. ........................... 239/10 |
| 4,886,208 | 12/1989 | Strand . |
| 4,895,303 | 1/1990 | Freyvogel . |
| 5,014,914 | 5/1991 | Wallenas . |
| 5,033,397 | 7/1991 | Colburn, Jr. . |
| 5,050,771 | 9/1991 | Hanson et al. ........................ 239/1 |

FOREIGN PATENT DOCUMENTS

0430347 6/1991 European Pat. Off. .

Primary Examiner—Randolph A. Reese
Assistant Examiner—Spencer Warnick
Attorney, Agent, or Firm—Haugen and Nikolai

[57] ABSTRACT

A variable rate fertilizer spreading apparatus for spreading a precise amount of multiple types of fertilizers upon a field based upon a location in the field. The system comprises a controller accessing a soil map indicating the type of soil for each portion of the field, several fertilizer maps storing the desired fertilizer level of each of the fertilizers stored in product bins on the tractor, and several status maps each indicating the current fertilizer level at various locations of the field to be fertilized. By accessing the speed of the tractor via a speed indicator, and ascertaining the location of the tractor in the field via a position locator, such as an LORAN or GPS system, an expert system determines the dispensing rate of each of the fertilizers based on the various maps and the position and speed indicators such that the proper dispense rate of the fertilizers from bins is set to attain the desired level of fertilizers. The expert system accesses standard and proprietary data tables and processes complex calculations taking into account the interaction effects of multiple fertilizers being dispensed upon a particular type of soil, as ascertained from the soil map. Thus, each portion of a field can be characterized and fertilized such that the resulting level of each of the fertilizers matches the fertilizer maps after spreading fertilizer, where no predetermined path of vehicle is necessary. The current fertilizer level map is updated after a dispensing pass to provide a real-time record.

11 Claims, 5 Drawing Sheets

VARIABLE RATE APPLICATION SYSTEM

FIELD OF THE INVENTION

The present invention relates generally to applying fertilizer to agricultural land, and more particularly to a method and apparatus for custom applying several types of fertilizer blends to specified locations in a field.

BACKGROUND OF THE INVENTION

Agricultural lands are typically comprised of several different soil types, each of which may be categorized according to the relative proportions of sand, clay and silt it contains. A typical agricultural field is usually fertilized with more than one blend of fertilizer, wherein the different soils and/or soil types absorb, release and otherwise react with the various fertilizer blends at differing rates. These differing rates depend upon the soil type, and upon the nutrient components present in the specific types of fertilizers. The three most common nutrient components present in fertilizer blends comprise a nitrogen, phosphorous, and potash. During a typical application of nitrogen, for instance, applying 50 pounds per acre will increase the field nitrogen level by 2%. However, this level of nitrogen can vary depending on the soil type and upon the application of a second and different blend of fertilizer. For instance, if applying 50 pounds per acre of phosphorous would increase the field phosphorous level by 2%, then the level of previously applied nitrogen may have a modified level due to the subsequent application of phosphorous the characteristics of the particular soil type, and the resultant interaction of the nutrient components. Thus, the calculations become rather complex when more than one type of fertilizer blend is added to a particular soil type. Further, since there may be several different types of soil encountered during the application of the fertilizer blends, the calculations can become even more complex.

Studies have been undertaken to quantify the effects of various different fertilizer blends applied in various combinations to different types of soil. Thus, a rather detailed data table or chart is available accounting for the various possibilities of different fertilizer blends combined and applied to different types of soil. Further, effects of sun, wind, and water drainage can also be considered to characterize the fertilizer levels over time based on the topography of the field.

Due to the unique soil distribution and topography of each field, a farmer's task becomes difficult when trying to custom apply a certain quantity of a certain fertilizer to certain areas of the field. Given the desirability of utilizing a large dispensing apparatus to a tractor 11, the various soil conditions and topography encountered during short periods of use can change quickly, since they are not uniformly patterned. Thus, it is not possible or practical for the farmer using conventional apparatus to attempt to reactively alter the dispensing rate of a particular fertilizer or nutrient component in a fertilizer blend as a tractor 11 traverses the field. Rather, with conventional apparatus, a farmer typically averages soil characteristics of a given portion of the field and applies a predetermined quantity of each fertilizer upon that portion of the field. Thus, while the predetermined quantity of a known blend of fertilizer components may be ideally suited for some portions of the land, the certain percentage of one nutrient component in of a blend fertilizer may be too high for some portions while a certain percentage of another is too low for another portion of land.

U.S. Pat. No. 4,630,773 to Ortlip teaches a method and apparatus for spreading fertilizer including a single digital map of the various soil types in a field to be fertilized. This map is normally ascertained from an aerial infrared photograph such that various portions of the land are categorized. The apparatus includes pixels arranged along an x-y locator and wherein the apparatus dispenses a certain percentage of a blend of fertilizers depending upon the location of the dispensing apparatus in the field according to the digital soil map. While this apparatus accounts for the changes of soil types throughout the field, it may not to account for the interactive effects of multiple fertilizers applied to different soil types. Further, the Ortlip apparatus does not consider the effects of fertilizer levels upon a field having varying characteristics due to a varying topography and existing fertilizer levels.

OBJECTS

It is accordingly a principle object of the present invention to provide a variable rate application apparatus capable of dispensing an appropriate amount of a single fertilizer based on the soil type at each particular location of a field to attain predetermined fertilizer levels. These levels can be determined from predefined characteristics, such as existing fertilizer levels, field topography or drainage studies.

It is a further object of the present invention to provide a variable rate application system capable of dispensing several different types of fertilizers and which takes into account the interaction between the several fertilizers.

It is a further object of the present invention to provide an apparatus which can calculate the appropriate application dispensing settings of the various fertilizers upon a given soil type to achieve the desired fertilizer levels.

It is a further object of the present invention to provide a feedback arrangement to sample and quantify the soil of a field to characterize the field.

It is a further object of the present invention to provide a fertilizer level sensing feature for characterizing and mapping present fertilizer levels of the field to be fertilized.

Other and further objects of the present invention will become apparent to those skilled in the art upon a study of the following specification, pending claims and accompany drawings, like numbered references correspond to like elements.

SUMMARY OF THE INVENTION

The foregoing features and objects are achieved by providing a variable rate application system having a first digital map characterizing the soil types, a plurality of second maps characterizing the desired level of various fertilizer types upon the field, and including a processing means to calculate and control the dispensing rates of the various fertilizers based on both the soil map and fertilizer maps. The application system comprises a vehicle 11 including a first product bin for holding the first fertilizer to be applied to the field to be fertilized. A dispenser is mounted on the vehicle 11 and operates in response to a first dispenser control signal for dispensing the first fertilizer at a selected dispensing rate from the first fertilizer bin. A conveying and spreading mechanism is mounted on the vehicle 11 for conveying the first fertilizer dispensed from the first bin via the dispenser over the ground. A controller is operatively connected to the dispenser for generating the first control signal to control the rate of dispensing the first fertilizer. The controller includes a digital soil map for storing and indicating a distribution of different soil types in the field to be fertilized. The controller further comprises a first fertilizer map partitioned into pixels or boundaries for storing and indicating a desired distribution level of the first fertilizer in the field to be fertilized. The apparatus includes a position locator for indicating the position of the vehicle 11 relative the field as it moves about the field which can be in cartesian, real, GPS, or boundary coordinates. The apparatus further includes a speed indicator for indicating the speed of the vehicle 11 as it moves about the field. The controller includes a first signal generator responsive to the soil map, the first fertilizer map, the position locator and the speed indicator and controls the generation of the first feeder control signal. The first signal generator correlates the position of the vehicle 11 in the field to a respective pixel or portion of both the soil map and the first fertilizer map, and determines the type of soil the vehicle 11 is over and the desired level of the first fertilizer at that particular location. The first signal generator adjusts the first feeder control signal in response to the determined soil type, the desired level of the first fertilizer, and the vehicle 11 speed to provide that the first fertilizer can be dispensed at different rates to attain the desired distribution of the first fertilizer in the field according to the first fertilizer map as the vehicle 11 moves about the field. Thus, the present invention controls the dispensing rate of the first fertilizer depending on both the soil type and on a desired level of the first fertilizer at each and every particular location in a field to be fertilized. The first fertilizer map allows one to custom design and attain a level of the first fertilizer to an entire field, for instance, based on the topography, the drainage characteristics, or the present level of the first fertilizer which already exists at each point in the field. Thus, each and every point in the field can be treated in a customized fashion to attain a particular and predetermined level of the first fertilizer.

In a further embodiment of the present invention, the variable rate application system comprises a second product bin mounted on the vehicle 11 for holding a second fertilizer, wherein a second dispenser is operative in response to a second dispenser control signal for dispensing the second fertilizer at a selected dispensing rate from the second product bin. The conveying and spreading mechanism conveys the second fertilizer dispensed from the second bin for spreading the second fertilizer over the ground. The controller further includes a second fertilizer map for storing and indicating a desired distribution of the second fertilizer in the field to be fertilized. The controller further comprises a second signal generator which is responsive to the soil map, the second fertilizer map, the position locator, and the speed indicator for generating the second dispenser control signal by correlating the position of the vehicle 11 in the field to both the soil map and the second fertilizer map. The second signal generator determines both the type of soil the vehicle 11 is currently over and the desired level of the second fertilizer, and adjusts the second dispenser control signal in response to the determined soil type, the desired level of the second fertilizer, and the vehicle 11 speed to provide that the second fertilizer can be applied at different rates to attain the desired distribution of the second fertilizer in the field according to the second fertilizer map as the vehicle 11 moves about the field.

In a further embodiment of the present invention, the application system further comprises a processor for coordinating the first and second signal generators where the first and second dispenser control signals are dependent on one another such that the resulting distribution of the first and second fertilizers upon the field is accomplished according to both the first and second fertilizer maps. Thus, the processor takes into account the interacting effects the first and second fertilizers have on one another and as applied to a particular soil type. Again, the desired levels of the first and second fertilizer can be custom designed, such that each and every location of the field will receive the appropriate quantity of each fertilizer blend based on a predetermined desired distribution of each fertilizer blend. The processor preferably comprises an artificial intelligence device including look-up tables which are well known but can also include proprietary tables as well characterizing the effects different fertilizers of different levels have on each other as applied to a certain type of soil. This complex lookup table allows the apparatus to determine in real-time the correct dispensing rate of each corresponding fertilizer to obtain the desired distribution level of the fertilizers.

DESCRIPTION OF THE PREFERRED EMBODIMENT

Figure 1:
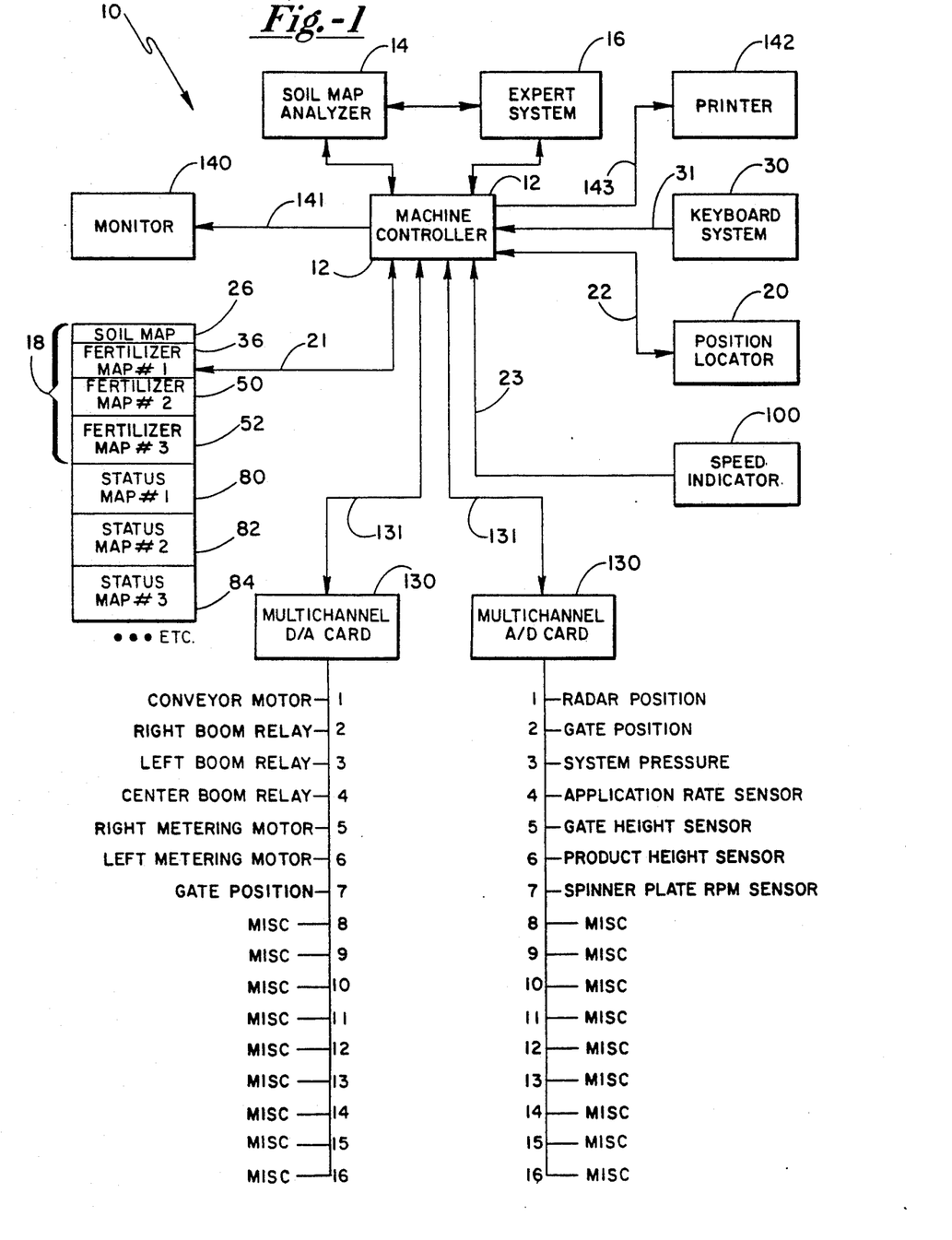
FIG. 1 illustrates a functional block diagram of the present invention showing the functional relationship between the soil map, the various fertilizer and status, the soil analyzer, maps, and the machine controller.
Figure 10:
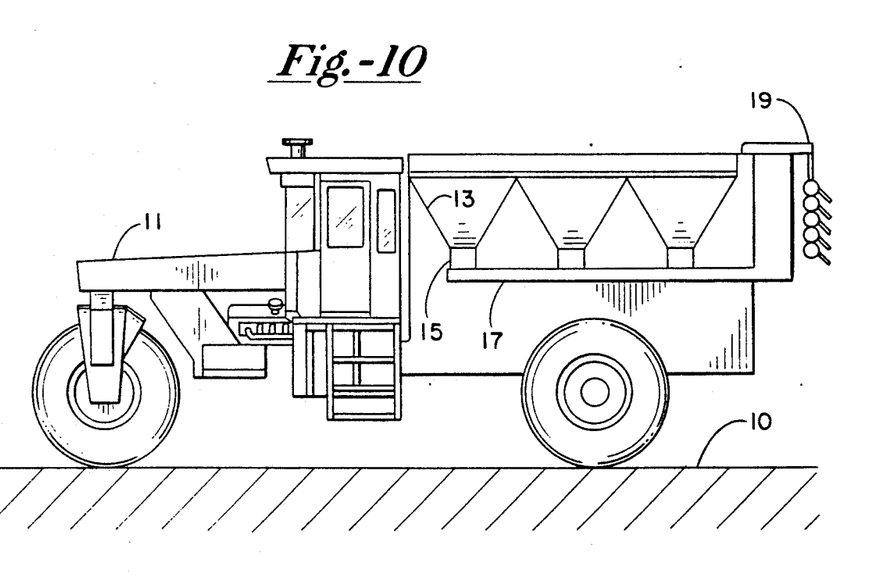
FIG. 10 is a pictorial view of a tractor 11 and dispensing system responsive to the control system.

Referring to FIGS. 1 and 10, a block diagram and a pictorial view of a variable rate application system according to the present invention is generally shown at 10. System 10 is adapted to a vehicle 11, such as a tractor 11 (see FIG. 10) and is based upon a microprocessor based machine controller 12, wherein controller 12 is a multitasking processing system based, for example, on a UNIX operating system. Controller 12 is the heart of the system for it coordinates and operates in response to other major subsystems to control the dispensing rate of multiple fertilizer blends contained in respective product bins 13 (see FIG. 10). Each fertilizer blend, such as nitrogen, phosphorous and potash, will be dispensed by a respective dispenser 13 from a respective bin 15 to a conveyor 17 at a rate controlled by controller 12. Controller 12 controls each dispenser 13 via an interface card 130 based upon the location of the vehicle 11, the speed of the spreader vehicle 11, the type of soil beneath the vehicle 11, and the desired level of each fertilizer blend at each particular location as the vehicle 11 travels throughout the field. The dispensed fertilizers are then conveyed via conveyor 17 to a pneumatic spreader apparatus 19, as taught by U.S. Pat. No. 5,028,009 assigned to the present applicant and hereby incorporated by reference.

Two other major systems operate in conjunction with each other and with controller 12 and are indicated as a soil map analyzer 14 and an expert system 16 which are both adapted to vehicle 11. Thus, the present invention is taught as a modular system, however, is recognized that soil map analyzer 14 and expert system 16 can all be combined into one unit with controller 12. Soil map analyzer 14, when activated, continuously samples soil as the tractor 11 moves throughout the field and analyzes the sample of soil to determine soil type and fertilizer levels. Soil analyzers are well-known by themselves. Controller 12 cooperates with soil map analyzer 14 and processes the results of analyzer 14 and defines a new, or updates or tempers an existing, soil map 26 which is stored in a computer memory 18. Memory 18 can be, for instance, comprised of RAM, ROM, or a virtual disk, and limitation to a particular type of memory is not to be inferred.

Figure 2:
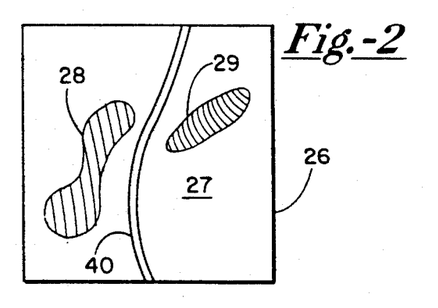
FIG. 2 illustrates a typical soil map of the present invention characterizing the distribution of various soil types of a field to be fertilized.

Memory 18 is partitioned into seven separate portions to store seven separate digital maps, the first being the soil map 26 which indicates the type of soil distributed throughout a particular field to be fertilized. However, limitation to only seven maps is not to be inferred. Referring to FIG. 2, a river 40 is represented in a field wherein portions 27, 28 and 29 indicate different soil types at particular locations of the field, such as silt, clay or sand. Referring back to FIG. 1, memory 18 includes three fertilizer maps 36, 50 and 52 which store a predetermined desired distribution of each respective fertilizer. The distribution can be custom designed based on topography, soil type, the type of plants being farmed, drainage characteristics, sun exposure, or any number of factors which need to be accounted for to maximize the yield of the plants. (See FIGS. 3-5). Three digital fertilizer status maps 80, 82 and 84 are also stored in memory 18 and provide the existing levels of each respective fertilizer prior to a fertilizing operation, and which can be updated or tempered during a fertilizing run. (See FIGS. 6-8).

Each map stored in memory 18 is preferably a digital map, digitally representing the respective information throughout the field. For instance, the soil map 26 may represent 100 acres of land, wherein the boundaries of the map correspond to the boundaries of the field. The four corners of the digitized map can correspond to the southwest corner of the field, the southeast corner, the northeast and the northwest corner of the field. Each map is represented as a pixel array having a size of 250×250 pixels, for example, but limitation to this size is not to be inferred. Further, while each map ideally represents a portion of a field identical in size, limitation to maps representing identically sized parcels of a field is not to be inferred either. Maps based on boundary equations as well to define a map, and limitation to a map based on a pixel array is not to be inferred. Equations reduce the size of memory necessary to store maps of large and multiple fields, for instance. Each pixel or portion of the map corresponds to a discrete portion of the field. Each pixel of map 26 represents the type of soil for that discrete portion of the field. The characteristics of each type of soil is stored in memory such that controller 12 can access the soil map 26 via line 21 to ascertain the soil type at a particular location. Similarly, each pixel of fertilizer maps 36, 50 and 52 and fertilizer status maps 80, 82 and 84 represent discrete fertilizer level information which is accessed by controller 12 as will be described shortly.

An x-y or position locator 20, such as a LORAN navigation unit, but which also could be a global positioning system (GPS), is provided for continuously providing in real-time machine controller 12 via line 22 the position of the system 10 in the field to be fertilized. Machine controller 12 coordinates the position information from position locator 20 to the particular associated pixel or portion of the soil map 26, thus, machine controller 12 ascertains a particular soil type represented by the particular pixel or portion of the soil map correlating to the position identified by locator 20. U.S. Pat. No. 4,630,773 to Ortlip is incorporated herein by reference to further teach the coordination of position locator 20 to the soil map where this particular feature of the present invention is known in the art as taught by Ortlip.

System 10 further comprises the plurality of fertilizer maps 36, 50 and 52 shown as fertilizer map number 1, fertilizer map number 2 and fertilizer map number 3, respectively, which are defined in partitioned memory 18. Each fertilizer map is independent from one another and corresponds to a particular portion of the field to be fertilized, similar to the soil map 26. Ideally, each fertilizer map is identically scaled and represents the exact same portion as the field soil map 26 so that, for instance, each corresponding pixel fertilizer and soil map corresponds to the same portion of land, thus providing an overlapping effect of information. Each fertilizer map is preprogrammed prior to a fertilizing run, for instance, by a keyboard system 30 via line 31, or from a previously stored file transferred via a tape or disk drive (not shown) into controller 12.

Figure 3:
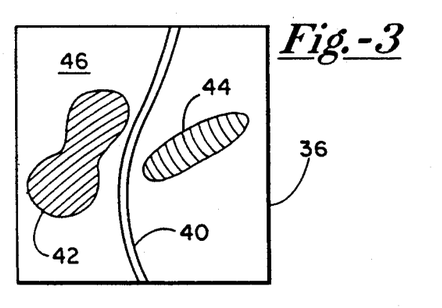
FIG. 3, FIG. 4 and FIG. 5 each illustrate a different fertilizer map indicating the desired level of each respective fertilizer for the field to be fertilized.

As an illustration of the present invention, fertilizer map 36 can correspond to the desired distribution levels of a first fertilizer blend, such as nitrogen, to be distributed upon the particular field. Referring to FIG. 3, a pictorial example of first fertilizer map 36 is shown. The size of fertilizer map 1 can correspond to 100 acres of land and is represented square in shape. The river 40 (shown in FIG. 2) is similarly defined throughout fertilizer map 36 as illustrated. A first portion of the represented field desired to have a first predetermined nitrogen level is shown as portion 42, and can correspond to an elevated hill or bluff defined in the field. A second portion of the field 44 having a second and different level of nitrogen can correspond to a low lying area of the field, which can be a higher or lower level than the level represented by portion 42. A third portion or the remaining portion of the field represented by numeral 46 can represent a third level of nitrogen desired to be attained upon dispensing nitrogen by system 10. Thus, the first fertilizer map 36 can be custom defined such that different areas of the field are correlated with a desired level of nitrogen. This correlation can be based on factors such as the topography of the field, the soil type, the draining characteristics of that particular point of the field, or the exposure of sun that part of the field represents. Thus, any number of factors can be taken into account when programming first fertilizer map 36.

Figure 4:
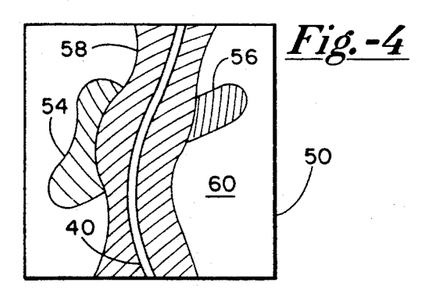
Figure 5:
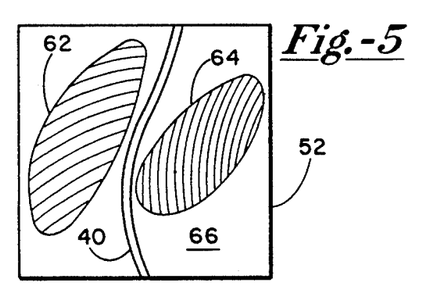

Similarly, the second and third fertilizer map 50 and 52 can be similarly defined and partitioned in memory 18 as shown in FIG. 1. Referring to FIGS. 4 and 5, a pictorial view of second fertilizer map 50 and third fertilizer map 52 are shown, wherein river 40 is again shown such that each map represents the same portion of field. Each of these three maps 36, 50 and 52 can be overlapped upon one another to see the ideal result of the three fertilizers combined after application by system 10 for a particular portion of the field. Referring to FIG. 4, a first portion 54, a second portion 56, a third portion 58 and a fourth portion 60 are shown representing the different desired levels of a second fertilizer, such as potash, which is desired at each particular point of the field. Similarly, as shown in FIG. 5, a first portion 62, a second portion 64 and a third portion 66 are shown corresponding to the desired levels of the third fertilizer, such as phosphorous, that is desired at each particular location of the field to be fertilized.

Different portions of the field require different levels of the various fertilizers due to the various factors mentioned, specifically the topography, the drainage characteristics, the sun exposure and the soil type. For instance, as shown in FIG. 4, the portion of land adjacent river 40 represented by portion 58 may require a specific level of potash which is different from the rest of the portion of the field due to drainage characteristics. As shown by FIGS. 3 and 5, the same portion of land adjacent river 40 may not have any unusual characteristics corresponding to these fertilizers such that the distribution of nitrogen or phosphorous does not particularly vary from the rest of the field. Referring to FIG. 3, if portion 42 represents the top of a hill, a heavier application of nitrogen may be required, wherein a higher level of potash represented by portion 54 in FIG. 4 ma also be required. Referring to FIG. 5, a higher level of phosphorous both at the top of the hill and about a periphery of the hill as represented by portion 62 is shown. Thus, each of the factors can be considered when defining the various fertilizer maps.

Figure 6:
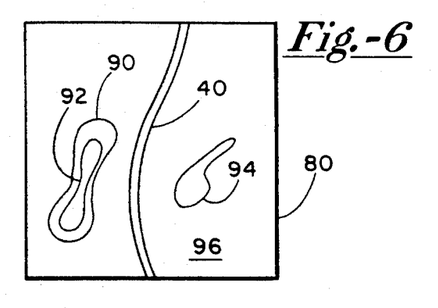
FIGS. 6, 7 and 8 each illustrate a different fertilizer map indicating the present level of each respective fertilizer in the field to be fertilized.
Figure 7:
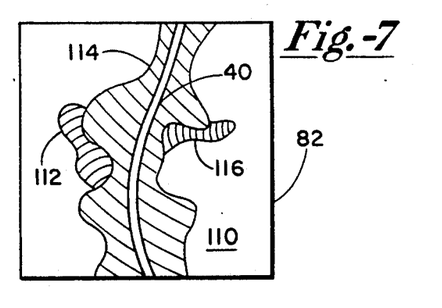
Figure 8:
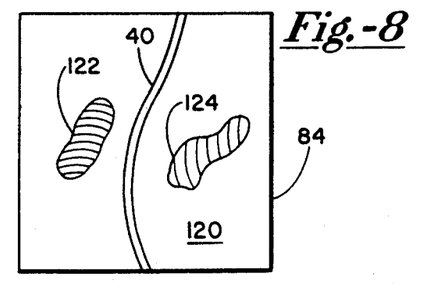

Referring to FIG. 6, 7 and 8, the current level of the respective fertilizers of nitrogen, potash and phosphorous are shown. Thus, FIG. 3 and 6 represent nitrogen, FIGS. 4 and 7 represent potash, and FIGS. 5 and 8 represent phosphorous. In FIG. 6, the first status map 80 (see FIG. 1) is graphically shown representing the current levels of nitrogen distributed throughout a particular field. The second status map 82 shown in FIG. 7 represents the current level of potash, and the third status map 84 shown in FIG. 8 represents the current levels of phosphorous. Status maps 80, 82 and 84 can be predefined in memory by first manually sampling portions of the field and entering the corresponding characteristics via keyboard system 30, or, can be continuously updated in real-time by machine controller 12 in response to the fertilizer information provided by soil map analyzer 14 based on the vehicle 11 location provided by x-y locator 20. Thus, a current and real-time record of the various fertilizer blends in a particular field can be maintained in memory for subsequent processing by controller 12.

Referring to first status map 80, as shown in FIG. 6, the distribution of nitrogen represented by portion 90, portion 92, portion 94 and 96 are illustrated to show the current levels of nitrogen. Referring to FIG. 7, second status map 82 shows existing levels of concentration of potash at corresponding locations prior to a pass of system 10. Various levels represented by portions 110, 112, 114 and 116 are shown wherein each portion represents a different level of potash. Referring to FIG. 8, third status map 84 is graphically illustrated representing the current level of phosphorous, wherein portions 120, 122 and 124 each indicate a different level of phosphorous at each particular location of the field.

As will be described shortly, as system 10 is driven throughout the field, or prior to a spreading application if the maps are not to be changed prior to application at the respective location, machine controller 12 will ascertain inputs corresponding to the current location of system 10 as provided by position locator 20 via line 22, the soil type provided by soil map 26, the desired fertilizer levels provided by each fertilizer map 36, 50 and 52, the current fertilizer levels provided by each status map 80, 82 and 84, and will ascertain the speed of the tractor 11 via a speed indicator 100, which is typically a radar based speed indicator that is well known in the art. Machine controller 12 will provide all this information corresponding to the current location of system 10 to the expert system 16. Expert system 16, as will be described shortly, ascertains and processes the data based on well known equations and data tables stored in memory which relate the two types and interactions of fertilizers and to the types of soil to subsequently, in real-time, provide output signals back to controller 12. Controller 12 then provides the appropriate output signals to the spreader and dispensing (not shown) system via a multichannel interface card 130 for spreading or dispensing the appropriate level of each fertilizer at that particular location of the field to attain the desired level of fertilizer shown in fertilizer maps 36, 50 and 52.

Referring now back to FIG. 1, machine controller 12 is operatively interfaced via a pair of multichannel D/A and A/D cards 130 and lines 131 to various devices on board the tractor 11, including the dispensers from the bins. As shown, the first card 130 interfaces a conveyor motor, a right boom relay, a left boom relay, a center boom relay, a right and left metering motor and a gate position device to controller 12. Similarly, the second card 130 interfaces information corresponding to the radar position, the gate position, the system pressure, the application rate sensor, a gate height sensor, a product height sensor and a spinner plate rpm sensor. Thus, machine controller 12 cooperates with, controls, and/or responds to each of the various devices via interface cards 130, wherein interfacing subsystems via interface cards to a controller is well known in the art.

Also shown in FIG. 1 is a monitor 140, such as a color CRT monitor for visually providing an operator via a line 141 a status of the various systems, as well as a digital map with a cursor indicating the relative position of the tractor 11 in the field. Thus, a color output providing graphical representation of data, as well as displaying all desired data simultaneously, eases the operator's need to understand several difficult consoles while operating system 10. A printer 142 is also provided for providing a hard copy of various information via line 143 as selected by the operator via keyboard system 30.

OPERATION

Figure 9A:
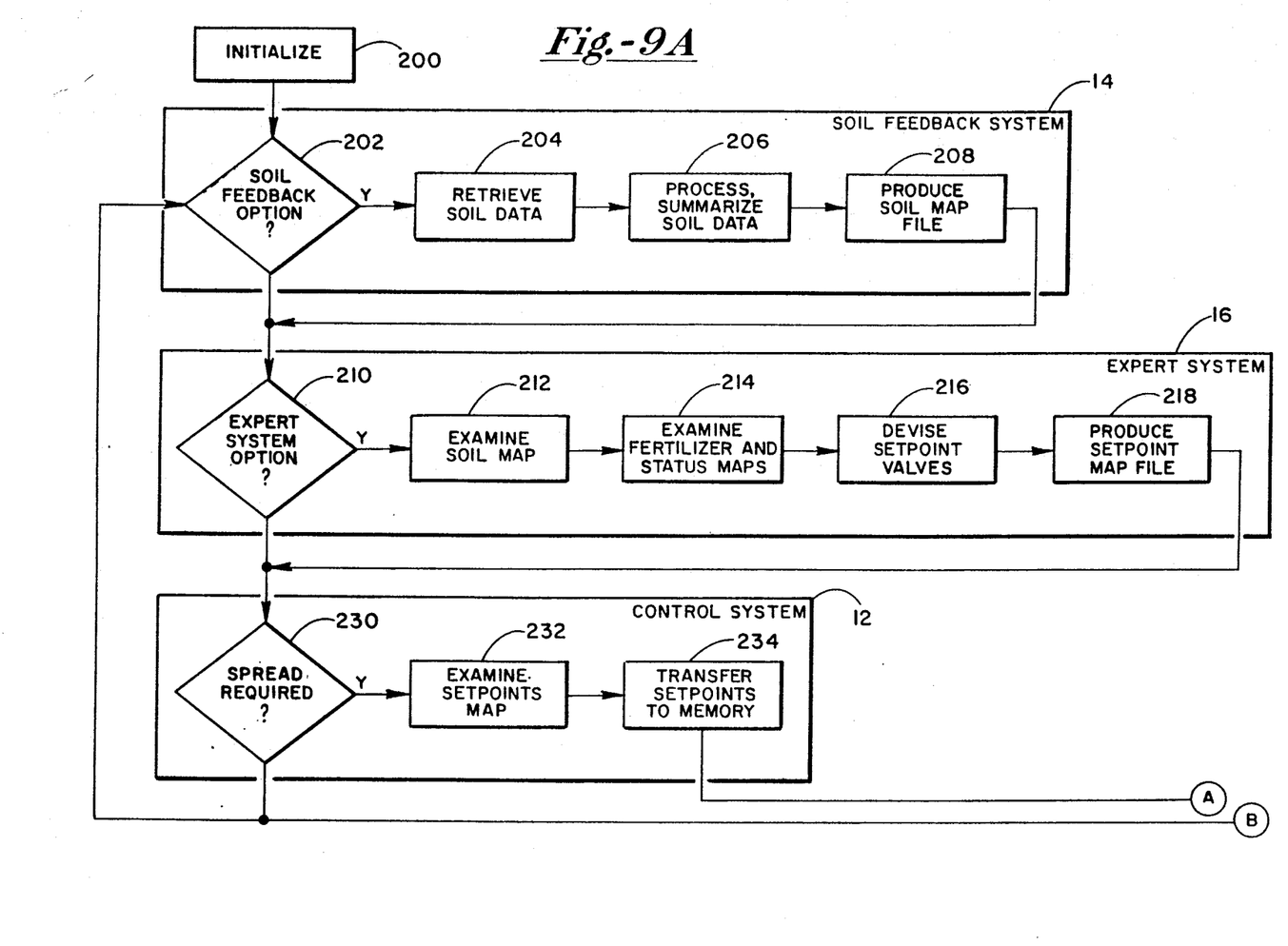
FIGS. 9A-9B illustrates a flow diagram of the algorithm for operating the present invention.

As will be discussed shortly in reference to flow diagrams shown in FIGS. 9A-9B, machine controller 12 provides outputs via interface cards 130 to dispensers 13 coupled to product bins 15 to dispense an appropriate amount of each contained fertilizer onto conveyor 17 for spreading by spreader 19. Expert system 16 comprises an artificial intelligence device which processes all the complex calculations associated with dispensing different fertilizers onto different types of soil having different preexisting levels of fertilizers. The calculations performed by expert system 16 take into account the effects different fertilizers have on each other and when applied to a particular type of soil. The basic calculations are all well known and can be executed manually, but the time required is extensive and cannot be performed in real-time. However, some calculations are empirically derived and considered proprietary trade secrets, taking into account exhaustive studies including in depth research. Thus, the present system is flexible and versatile for executing customized and secret equations as well. Thus, expert system 16 executes the number crunching in real-time to provide a practical solution to dispensing different fertilizers according to the present invention.

For instance, while applying 50 pounds per acre of nitrogen to raise the nitrogen level 2%, by applying 50 pounds per acre of phosphorous to obtain a phosphorous level of 2%, the level of nitrogen will fall below or rise above 2%. Thus, different fertilizers interact when applied to a particular type of soil such that the release rate varies in a way which can be calculated, but wherein the calculations are extremely complex. Expert system 16 accesses prestored well-known and proprietary data tables and executes equations in real-time as apparatus 10 is driven throughout the field. Controller 12 responds to the results from expert system 16 such that an appropriate level of each fertilizer will be dispensed such that each of the fertilizer maps 36, 50 and 52 are the net result after dispensing each of the fertilizers. By taking into account the soil type as provided by soil map 26, by taking into account the current levels of each of the respective fertilizers as provided by maps 80, 82 and 84, by referencing x-y locator 20, and in response to the speed of the tractor 11 provided by speed indicator 100, the appropriate level of fertilizers are dispensed to yield the net desired levels of each of the fertilizers.

Now referring to the flow diagrams in FIG. 9A-9B the algorithm performed by machine controller 12 will be discussed in detail. First referring to FIG. 9A, upon initialization at step 200, if soil map analyzer 14 is enabled at step 202, the system proceeds to step 204 wherein a sample of soil beneath the tractor 11 is retrieved by analyzer 14 and analyzed at step 206. At step 208, soil map 26 is defined or tempered, as the case may be, for the particular pixel or portion of soil map 26 corresponding to the current location of the tractor 11, as provided by x-y locator 20. Soil map 26 can also be predefined and stored in memory by manually entering the soil type for each particular location of the field via the keyboard system 30. For instance, information can be manually obtained by sampling various portions of the field, or ascertained by an infrared camera from above the field. Thus, soil map analyzer 14 does not necessarily need to be activated for the proper operation of system 10 since the soil distribution in the field can be characterized and stored in soil map 26 prior to a fertilizing run.

After updating soil map 26 at step 208, or if soil analyzer 14 is not activated at step 202, the algorithm proceeds to step 210 to determine that if expert system 16 is activated. If expert system 16 is activated, the algorithm proceeds to step 212 wherein expert system 16 examines the entire soil map 26. The algorithm proceeds to step 214 wherein expert system 16 ascertains the desired fertilizer levels for the entire field of each of the respective fertilizers as indicated by the respective fertilizer maps 36, 50 and 52. Expert system 16 also ascertains the current level of each respective fertilizer by accessing status maps 80, 82 and 84, and which may be updated in real time by analyzer 14 to provide the current level of each of the fertilizers in the soil directly beneath the tractor 11 prior to dispensing fertilizer. However, current fertilizer levels may be considered negligible and referencing status maps 80, 82 and 84 is not mandatory for proper operation of system 10.

Upon examining soil map 26 at step 212, and ascertaining at step 214 both the current levels of the respective fertilizers beneath the tractor 11 from status maps 80, 82, 84, and the desired levels of each of the fertilizers from the fertilizer maps 36, 50 and 52, expert system 16 at step 216 devises set point values to produce a set point map file at step 218. The set point map file is a file containing the set points of each of the fertilizer dispensers 13 corresponding to a predetermined speed for each location of the field to be fertilized, thus providing normalized values. A reference set point for each dispenser 13 is identified for each location of the field such that the desired fertilizer levels stored in fertilizer maps 36, 50 and 52 will be attained when the tractor 11 is driven over the corresponding location of the field as sensed by position locator 20.

It is noted that if soil map analyzer 14 if not activated, expert system 16 can perform steps 212, 214, 216 and 218 to define the set point map file for reference as the tractor 11 moves throughout the field for fertilizing since the soil map 26, the fertilizer maps 36, 50, 52 and the status maps 80, 82 and 84 are defined and not being updated. If expert system 16 is not activated at step 210, or upon conclusion of step 218, the algorithm iterates and proceeds to step 230 to determine from the set point map file if spreading of any of the fertilizers stored in the bins 15 is necessary for the particular location the tractor 11 is at.

The algorithm proceeds back to step 202 if the set point values from the set point map file indicate that the fertilizer levels are already at a desired level for the present location and no spreading is necessary. However, at step 230, if any of the fertilizer levels at the present location as indicated by status maps 80, 82 or 84 do not match the desired fertilizer levels as stored in fertilizer maps 36, 50 or 52, then a corresponding non-zero set point value as ascertained from the set point map file is examined at step 232 to determine which dispensers should be activated and at what setting. The algorithm proceeds to step 234 and transfers the set points into memory at step 234.

Figure 9B:
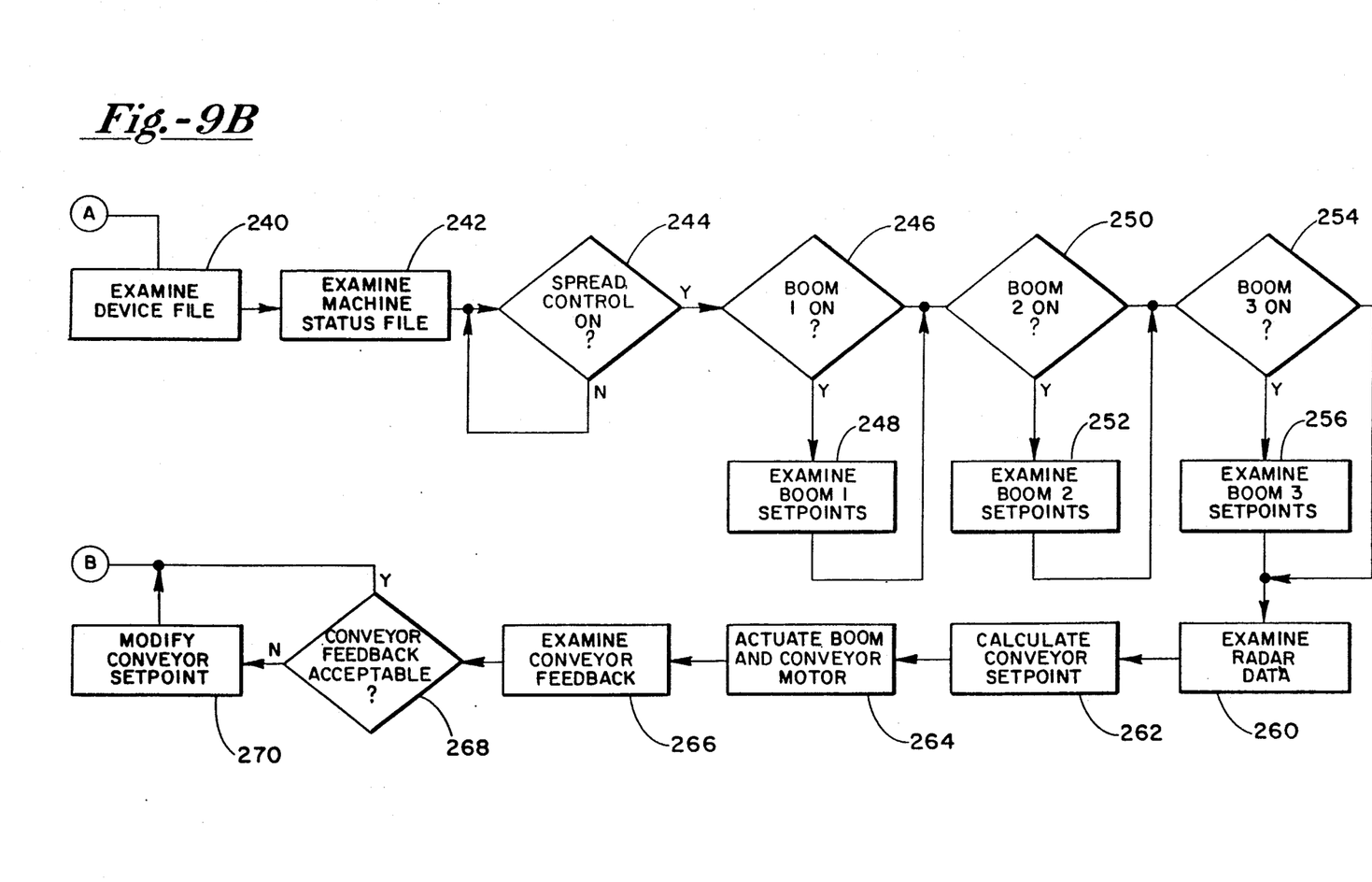

Next, referring to FIG. 9B the algorithm proceeds to step 240 where a device file is examined. The device file includes relevant information for the particular type of vehicle 11 or tractor 11 including the operating characteristics of the equipment provided on the tractor 11. Next, step 242 is implemented wherein a machine status file is examined. This includes the steps of ascertaining via the interface cards 130 if various subsystems are in a functional mode by performing the following steps. First, at step 244, controller 12 determines if the conveyor 17 and the master spread controller 19 are on. The algorithm loops back to step 244 until the conveyor 17 and spread controller 19 are enabled. Then, step 246 is implemented to see if boom number 1 of spreader 19 is on. If it is, step 248 is performed to examine the set point of the corresponding boom. Subsequently, step 250 is performed to see if boom number 2 is on, wherein step 252 is performed to examine the set point of boom number 2. Finally, step 254 is performed to determine if boom number 3 is on, wherein step 256 is performed to examine the set point of associated boom number 3. The determination of whether the conveyor 17 and spread controller is on, whether booms 1, 2 and 3 are on and the set points of boom 1, 2 and 3 are all determined by machine controller 12 via the associated interface card 130 as shown in FIG. 1.

Next, step 260 is performed wherein radar data from speed indicator 100 is examined to determine the speed of the tractor 11 at that given moment. Next, step 262 is performed wherein controller 12 calculates the conveyor 17 speed set point. Next, step 264 is performed wherein the boom and conveyor motors are actuated, and each dispenser 13 coupled to the associated fertilizer bin 15 is opened and set to the position corresponding the set point in memory for the given tractor 11 location. The dispenser position is adjusted proportionally if the current tractor 11 speed is other than the predetermined speed the set point is normalized and referenced to. For instance, if the tractor 11 is traveling at a speed twice the reference speed, the dispenser 13 will be opened at a position twice that set point such that the net amount of fertilizer disposed per unit of land is uniform. Next, step 266 is performed wherein the conveyor feedback signals from conveyor 17 and spreader 19 are examined, wherein at step 268 a determination is made whether the feedback signals are still acceptable. If not, step 270 is performed and the conveyor set points are modified accordingly to ensure the conveyor is again operating acceptably. Again, the conveyor 17 transfers dispensed fertilizer to spreader 19, as taught in the previously cited patent. Finally, the algorithm proceeds back up to step 202 in FIG. 9A again, wherein the algorithm will proceed its way back down to step 240 again eventually. The algorithm executes steps 240 through 270 whenever dispensing is necessary at the particular location to attain fertilizer levels corresponding to fertilizer maps 36, 50 and 52. The conveyor set point and each dispenser set point is appropriately maintained such that the appropriate level of the respective fertilizer is spread onto the field according to the fertilizer maps 32, 50 and 52.

In summary, based upon the soil-type information from soil map 26, the respective fertilizer and status maps, as well as the speed provided by speed indicator 100, expert system 16 manipulates this information and provides a resulting calculation to controller 12 such that controller 12 can generate the appropriate output signals to the dispensers 13 coupled to each of the product bins 15 holding each of the respective fertilizers (not shown). The dispenser set points can be calculated prior to a fertilizing run by manipulating the current data, or defined in real-time as the vehicle 11 samples the soil for each particular location.

Given the discrete size of the field represented in the maps, and based on the dispenser settings for each location, the total amount of each fertilizer to be dispensed can be calculated prior to a fertilizing run to aid in planning. The path through the field can be random or planned since the dispenser settings are coordinated with position in the field. Overlapping a particular portion of land will not result in a subsequent dispensing at fertilizer since the current level maps 80, 82 and 84 are updated in real-time, and the controller will realize no additional dispensing is needed on the second pass. Thus, the farmer is free to choose a path.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Fertilizer blending and spreading apparatus comprising:
   a vehicle;
   a first product bin mounted on the vehicle for holding a first fertilizer to be applied to a field to be fertilized;
   dispensing means mounted on the vehicle operative in response to a first dispenser control signal for dispensing the first fertilizer at a selected dispensing rate from the first product bin;
   conveying and spreading means mounted on the vehicle for conveying the first fertilizer dispensing from the first bin via the dispensing means and spreading the first fertilizer over the ground; and
   control means operatively connected to the dispensing means for generating the first feeder control signal to control the rate of dispensation of the first fertilizer, the control means including:
   (a) digital soil map means for storing a digital soil map indicating a distribution of different soil types in the field to be fertilized;
   (b) first fertilizer map means for storing a first digital fertilizer map indicating a desired distribution of the first fertilizer in said field to be fertilized;
   (c) first status map means independent of said first fertilizer map means for storing data representative of a first field characteristic;
   (d) position locator means for indicating the position of the vehicle relative to said field as it moves about said field;
   (e) speed indicator means for indicating the speed of said vehicle as it moves about said field; and
   (f) first signal generating means responsive to said soil map means, said first fertilizer map means, said independent first status map means, said position locator means and said speed indicator means for controlling the generation of said first dispenser control signal by correlating the position of said vehicle in the field to said soil map, said independent first status map and said first fertilizer map, and determining the type of soil the vehicle is currently over, the first field characteristic where the vehicle is over, the desired level of the first fertilizer, and the vehicle speed to provide that the first fertilizer can be applied at different rates to attain the desired distribution of the first fertilizer in the field according to the first fertilizer map means as the vehicle moves about the field.

2. The apparatus as specified in claim 1 further comprising:
   (f) a second product bin mounted on the vehicle for holding a second fertilizer, wherein the dispensing means is operative in response to a second dispenser control signal for dispensing the second fertilizer at a selected dispensing rate from the second product bin, wherein the conveying and spreading means conveys the second fertilizer dispensed from the second product bin for spreading the second fertilizer over the ground;

(g) wherein the control means generates the second dispenser control signal and further includes a second fertilizer map means for storing a second digital fertilizer map indicating a desired distribution of the second fertilizer in said field to be fertilized, and a second status map means independent of both said first status map means and said first fertilizer map means for storing data representative of a second field characteristic; and (h) second signal generating means responsive to the soil map means, said second fertilizer map means, said independent second status map means, said position locator means and said second indicator means for controlling the generation of said second dispenser control signal by correlating the position of the vehicle in the field to both said soil map, the independent second status map, and said second fertilizer map, and determining the type of soil the vehicle is currently over, the second field characteristic where the vehicle is over, and the desired level of the second fertilizer, and adjusting said second dispenser control signal in response to the determined soil type, the second field characteristic, the desired level of the second fertilizer, and the vehicle speed to provide that the second fertilizer can be applied at different rates to attain the desired distribution of the second fertilizer in the field according to the fertilizer map means as the vehicle moves about the field.

3. The apparatus as specified in claim 2 further comprising processing means for storing data representative of interactive affects of the first and second fertilizers with one another and coordinating the first and second signal generating means depending upon the data representing the interactive affects, where the first and second dispenser control signals are dependent on one another such that a resulting distribution of the first and second fertilizer upon the field is accomplished according to both the first and second fertilizer map means.

4. The apparatus as specified in claim 1 further comprising feedback means operatively coupled to the control means for sampling soil types and tempering the soil map means.

5. The apparatus as specified in claim 1 further comprising first feedback means operatively coupled to the control means for sampling the soil to determine the first field characteristic and tampering the first status map means.

6. The apparatus as specified in claim 5 further comprising second feedback means operatively coupled to the control means for sampling the soil to determine the second field characteristic and tampering the second status map means.

7. The apparatus as specified in claim 1 wherein the first status map means stores a current distribution of a first fertilizer upon the field, wherein the first signal generator means generates the first dispenser control signal as a function of the current fertilizer distribution stored in the first status map means.

8. The apparatus as specified in claim 2 wherein said first status map means is updated in real-time as the vehicle traverses the field to be fertilized.

9. A method for distributing fertilizer on a field to be fertilized from a distributing vehicle carrying a plurality of products in a plurality of product bins comprising the steps of:

(a) providing a digital soil map;
(b) providing a digital fertilizer map;
(c) providing a first field characteristic status map independent of said digital fertilizer map;
(d) determining the position of said distributing vehicle in said field relative to said maps;
(e) determining the speed of said distributing vehicle;
(f) determining from the soil map the type of soil located where said vehicle is located;
(g) determining from the fertilizer map the desired levels of the products to be attained where said vehicle is located;
(h) determining from the first field characteristic status map the first field characteristics where the vehicle is located;
(i) determining the product rate at which product should be applied to said field based on the type of soil, the first field characteristic, the desired fertilizer level, and the speed of the vehicle determined in steps (e), (f), (g) and (h); and
(j) feeding, conveying and spreading said products from said product bins at dispensing rates proportionate to said determined product rates and vehicle speed.

10. The method as specified in claim 9 further comprising the steps of:

(i) determining from the first field characteristic status map the present levels of the products where the vehicle is located; and
(j) determining the product rate in step (g) also based on the present level of the products determined in step (i).

11. The method as specified in claim 9 further comprising the step of updating the first field characteristic status map after spreading said products.

* * * * *

UNITED STATES PATENT AND TRADEMARK OFFICE
CERTIFICATE OF CORRECTION

PATENT NO. : 5,220,876
DATED : June 22, 1993
INVENTOR(S) : Robert J. Monson and Norman A. Bauer It is certified that error appears in the above-identified patent and that said Letters Patent is hereby corrected as shown below:

Column 12, line 21, "dispensing" should read -- dispensed --.
Line 49, "said" (first occurrence) should read -- the --.

Column 13, line 15, "second" should read -- speed --.
Line 49, "tampering" should read -- tempering --.

Column 14, line 2, "tampering" should read -- tempering --.

Signed and Sealed this

Eleventh Day of January, 1994

Attest:

BRUCE LEHMAN

*Attesting Officer*   Commissioner of Patents and Trademarks